United States Patent [19]
Chow

[11] Patent Number: 6,048,062
[45] Date of Patent: Apr. 11, 2000

[54] STRUCTURE OF FOLDABLE GLASSES

[76] Inventor: Ching-Chain Chow, No.7, Ching Yun Street, Taipei, Taiwan

[21] Appl. No.: 09/244,171

[22] Filed: Feb. 4, 1999

[51] Int. Cl.$^7$ ........................................................ G02C 5/08
[52] U.S. Cl. .................................. 351/63; 351/41; 351/119
[58] Field of Search .................................. 351/63, 41, 158, 351/111, 119, 118, 124, 128; 2/454

[56] References Cited

U.S. PATENT DOCUMENTS

| | | | |
|---|---|---|---|
| 1,936,319 | 11/1933 | Wingate | 351/63 |
| 2,307,419 | 1/1943 | McNeill et al. | 351/63 |
| 4,367,929 | 1/1983 | Fortini | 351/63 |
| 5,532,766 | 7/1996 | Mateer et al. | 351/63 |

*Primary Examiner*—Hung Xuan Dang
*Attorney, Agent, or Firm*—Rosenberg, Klein & Lee

[57] ABSTRACT

An improved structure of a foldable glasses comprises two lenses and two supporting legs. The front ends of the two supporting legs are pivotally connected with outer sides of the two lenses, the supporting legs are formed with respective front sections and rear sections, the front sections and the rear sections are pivotally connected with one another. Each of the two lenses has a respective pivotal portion, and the two pivotal portions are horizontally penetrated by a pivotal element so as to pivotally connect the two lenses. Thereby, foldable, portable and storable glasses structure are formed and these glasses are suitable to glasses without frames and have a special folded way. Thus, the two lenses and two supporting legs are formed with a folding way in different directions so as to reduce the overlapping width.

4 Claims, 6 Drawing Sheets

STRUCTURE OF FOLDABLE GLASSES

BACKGROUND OF THE INVENTION

1. Field of the Invention

The present invention relates to an improved structure of foldable glasses, and especially to a foldable glasses without a frame and having a novel folded way.

2. Description of the Prior Art

A foldable glasses has been designed in the prior art. The pivotal point on the middle portion of the two frames can be folded backwards and the supporting legs also can be folded so to formed with a small volume for being carried and stored easily. Such kind of design has been described in Taiwan Patent No. 307381, 330696, 335907, etc. However, the prior art foldable glasses are only suitable for glasses with a frame. If glasses have no frame, it can not be used. Moreover, two lenses and two supporting legs are folded in the same directions so as to form a larger width. These are relatively inconvenient for users.

SUMMARY OF THE INVENTION

Accordingly, the object of the present invention is to provide a improved structure of a foldable glasses comprising two glasses and two supporting legs. Pivotal portions are integrally formed in the inside of the two lenses. Therefore, it can be used in a glasses without any glasses frame. Furthermore, the pivotal portions of two lenses are pivotally connected by a horizontal pivotal element so that the two lenses can be folded upwards. By this special folding way, the two lenses are overlapped by using the horizontally installed fist pivotal element as a fulcrum. Therefore, the two lenses and supporting legs are folded in different directions, and thus it has the function of reducing the folding width.

The present invention will be better understood and its numerous objects and advantages will become apparent to those skilled in the art by referencing to the following drawings in which:

DETAILED DESCRIPTION OF THE PREFERRED EMBODIMENT

Figure 1:
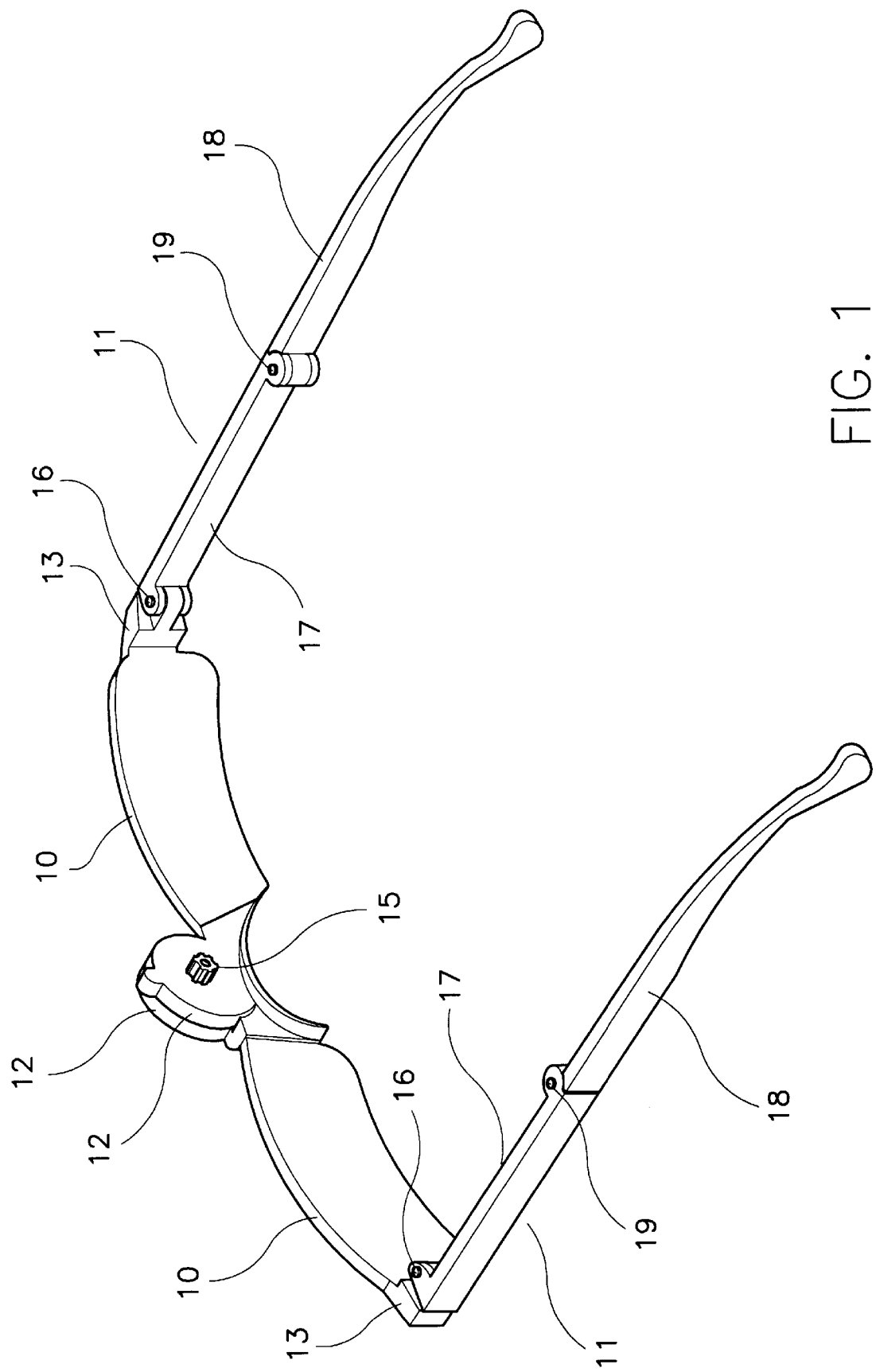
FIG. 1 is a perspective view of the present invention.
Figure 2:
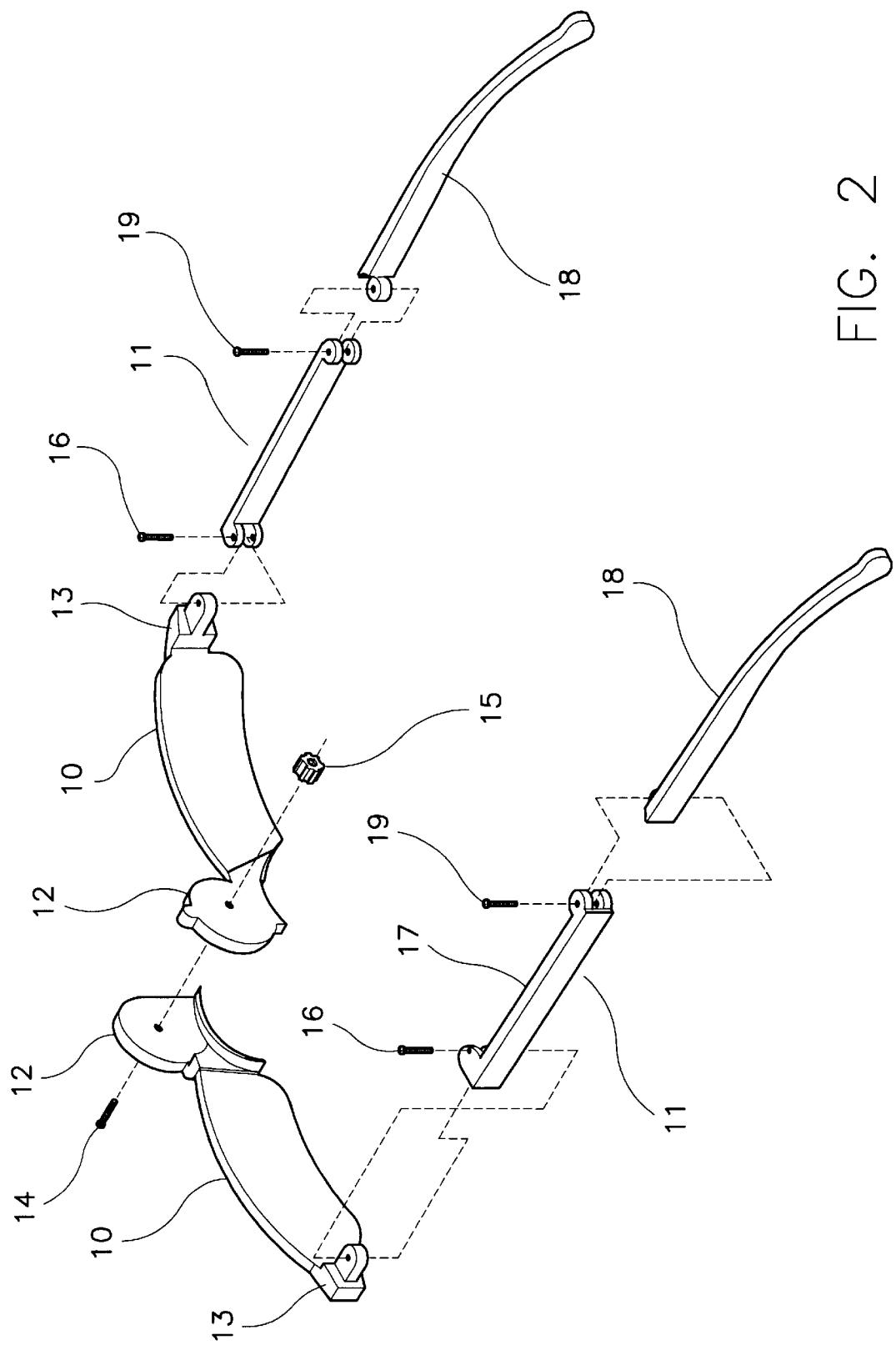
FIG. 2 is an exploded perspective view of the present invention.
Figure 3:
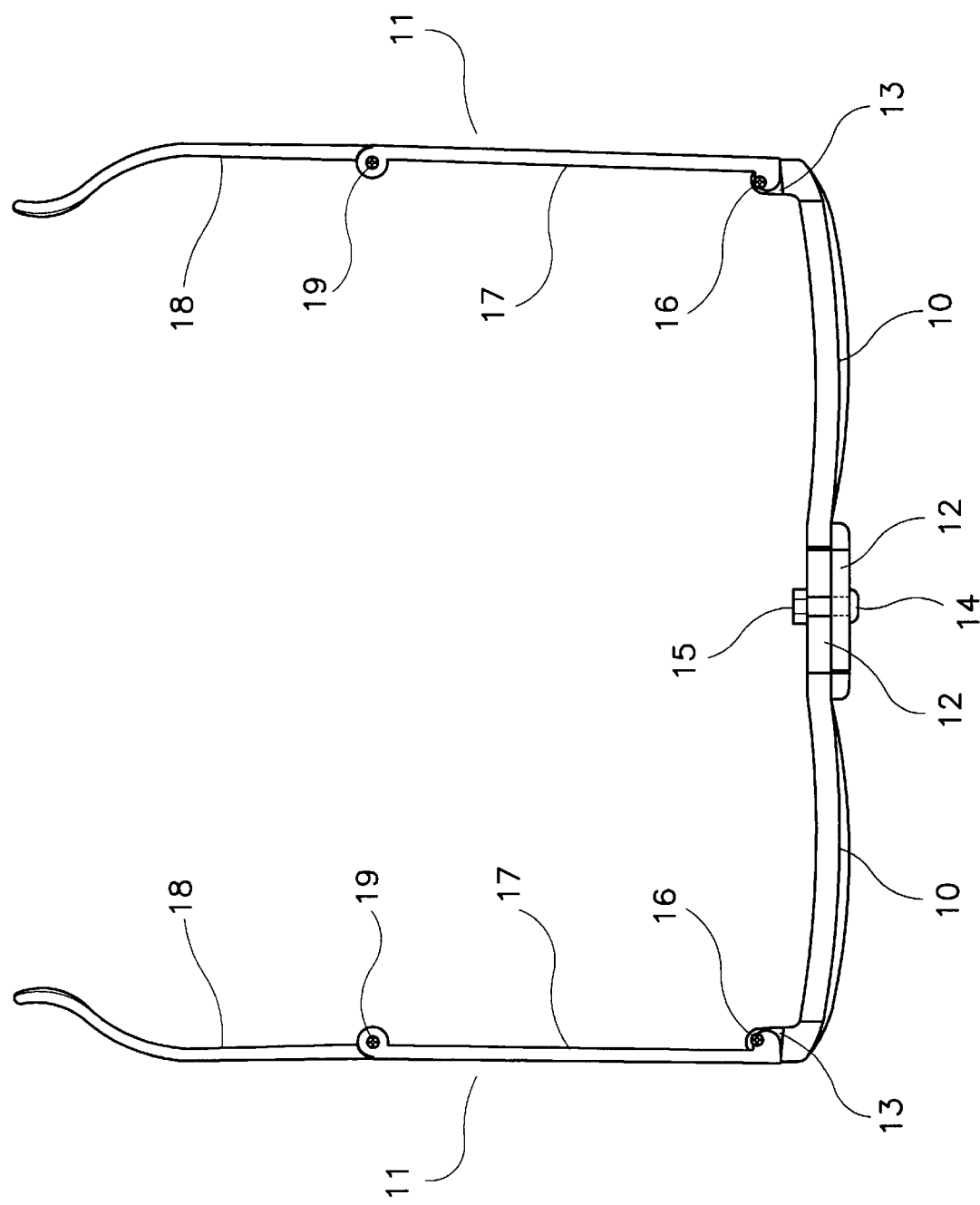
FIG. 3 is an elevation view of the present invention.

As show in FIGS. 1, 2, and 3, the improved structures of a foldable glasses of the present invention are illustrate. The present invention is related to improved structures of foldable glasses, and especially to glasses without frames. The improved structure of foldable glasses according to the present invention includes two lenses 10 and two supporting legs 11. The lenses 10 are made of plastic materials. The top ends of two lenses 10 are formed as a plane shape for being combined conveniently. The inner side of the lens 10 has a first pivotal portion 12, and the outer side thereof has a second pivotal portion 13. A first pivotal element (screw) can horizontally penetrate through the first pivotal portions 12 of the two lenses 10 for pivotally connecting the two plate containing groove. One end of the first pivotal portion may be fixed by a fixing element (nut).

The two supporting legs are installed outside the two lenses 10, respectively. The front ends of the two supporting legs are pivotally connected with the second pivotal portions by vertically penetrating through the second pivotal elements 16. The supporting leg 11 includes a front section 17 and a rear section 18. The front section 17 and the rear section 18 are pivotally connected by a third pivotal element 19 vertically installed therethrough. By the aforementioned structure, an improved structure of foldable glasses according to the present invention are formed.

Figure 4:
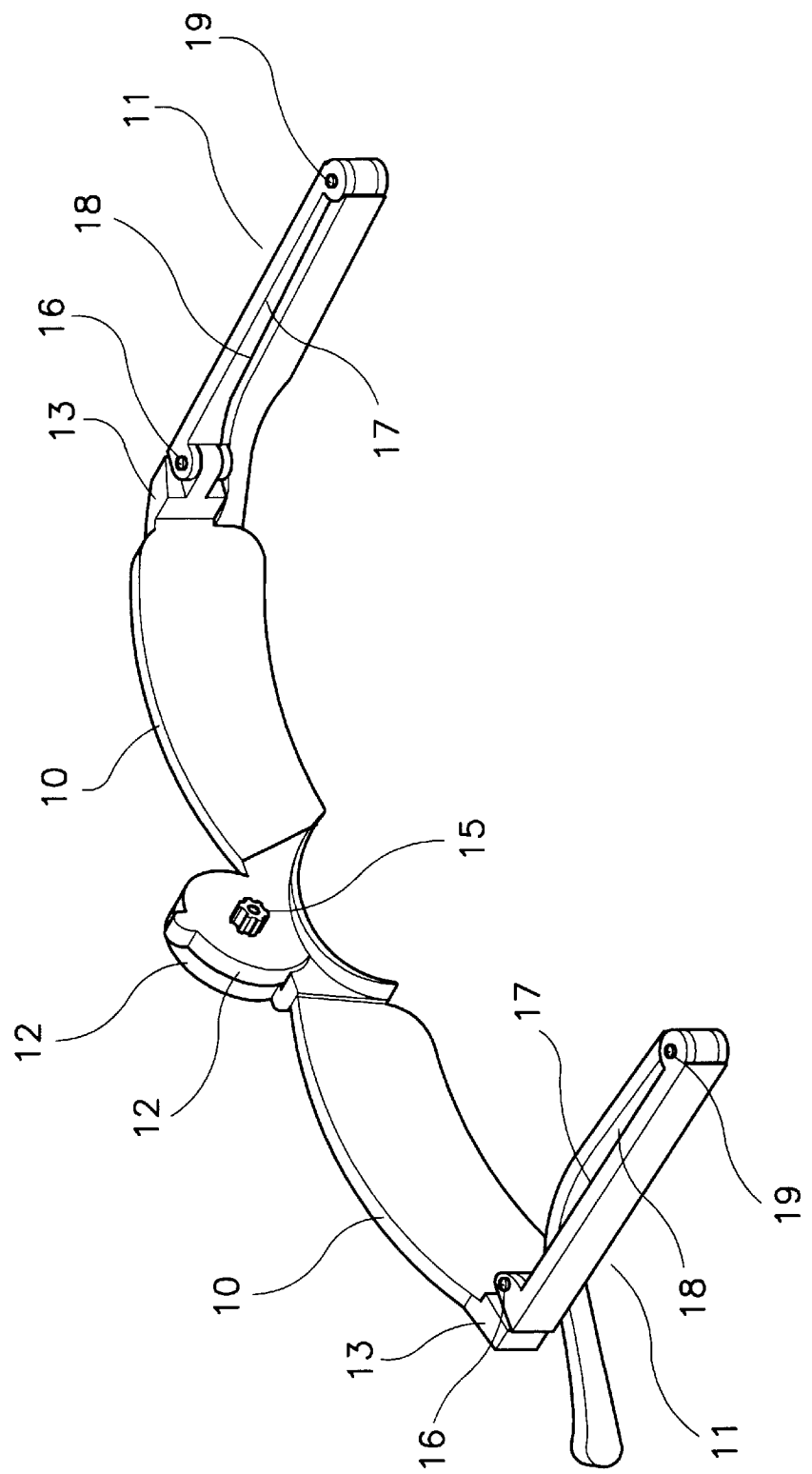
FIGS. 4, 5 and 6 a schematic view showing that the present invention is in a folded manner.
Figure 5:
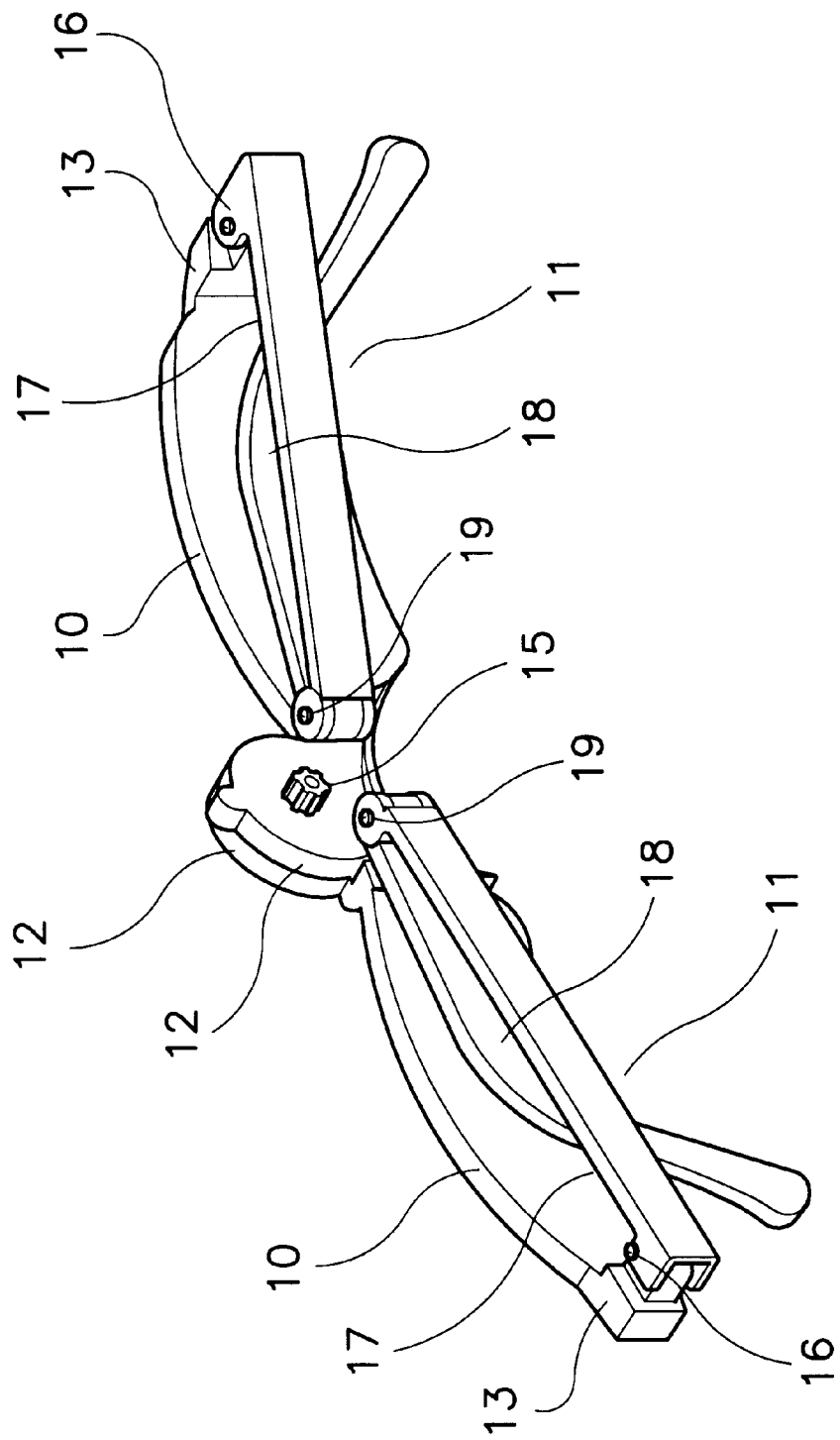
Figure 6:
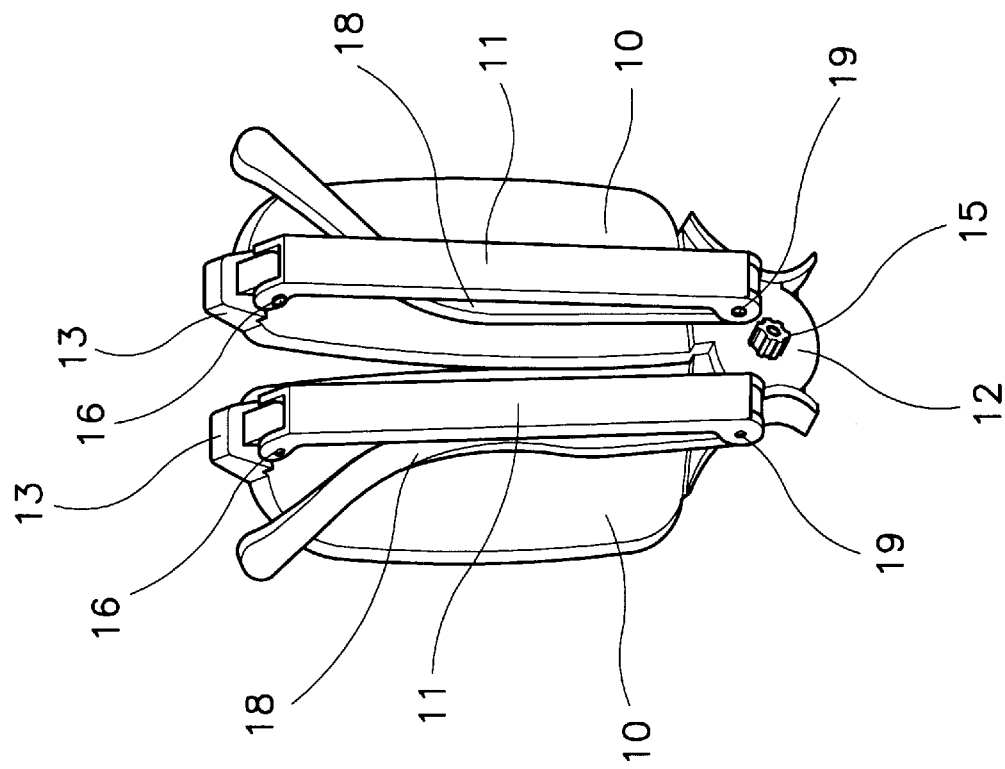

As shown in FIGS. 4 and 6, when the present invention is desired to be folded. By using the second pivotal elements 19 as a fulcrum, the front sections 17 and the rear sections 18 of the two supporting legs 11 are overlapped so that the front section 17 and the rear section 18 are overlapped (as shown in FIG. 4). Also, the two supporting legs 11 can be overlapped by using the second pivotal elements 16 as a fulcrum so that the overlapped front sections 17 and the rear sections 18 are overlapped with the two lenses 10 (as shown in FIG. 5). Another, the two lenses 10 can be folded upwards by using the first pivotal element 14 as a fulcrum (as shown in FIG. 6). The fold glasses have a small area by which it can be carried or stored conveniently.

In the present invention, pivotal portions 12 are integrally formed in the inside of the two lenses 10, thus glasses frames are unnecessary to be installed for pivotally supporting the two lenses 10. Therefore, it can be used in glasses without any frames. Furthermore, the pivotal portion 12 of two lenses 10 are pivotally connected by a horizontal pivotal element 14 so that the two lenses can be folded upwards. The two lenses 10 are combined by the plane shape top ends. By this special folding way, the two lenses 10 are overlapped by using the horizontally installed first pivotal element 14 as a fulcrum. The two supporting legs 11 are overlapped by the vertically installed second pivotal elements 16 and the third pivotal elements 19. Therefore, the two lenses 10 and supporting legs 11 are folded in different directions, and thus it has the function of reducing the folding width.

In summary, the prior art glasses structure has been improved by the present invention. The prior art glasses is only suitable for glasses with frames and the supporting legs of the two lenses are folded in the same direction and thus the width is larger. However, these problems have been improved by the present invention.

Although the present invention has been described using specified embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

Description of the Numerals in Figures

| 10 | Lenses | 11 | Supporting leg |
| 12 | First pivotal portion | 13 | Second pivotal element |
| 14 | Pivotal element | 15 | Fixing element |
| 16 | Second pivotal element | 17 | Front section |
| 18 | Rear section | 19 | Third pivotal portion |

What is claimed is:

1. A collapsible eyeglass system comprising:

(a) a pair of pivotally coupled lenses, said lenses each having an outer end and an inner end, said lenses each having formed at said inner end thereof a pivotal portion, said pivotal portions being disposed in substantially planar contact one with the other in angularly displaceable manner about a first pivot axis extending in a lateral direction; and, (b) a pair of supporting leg members respectively coupled to said lenses, each said supporting leg member including pivotally coupled front and rear sections, said front section being pivotally coupled to said outer end of one said lens for displacement relative to said lens about a second pivot axis, said rear section being displaceable relative to said front section about a third pivot axis, at least one of said second and third axes extending in a direction transverse to said lateral direction.

2. The collapsible eyeglass system as recited in claim 1 wherein each said lens includes a substantially planar top end.

3. The collapsible eyeglass system as recited in claim 1 further comprising a pivotal element and a fixing element mated thereto for coupling together said pivotal portions of said lenses, said pivotal element defining said first pivot axis.

4. The collapsible eyeglass system as recited in claim 1 wherein said pivotal portions are integrally formed, respectively, on said lenses.

* * * * *